United States Patent
Poupyrev

(10) Patent No.: US 9,811,164 B2
(45) Date of Patent: Nov. 7, 2017

(54) RADAR-BASED GESTURE SENSING AND DATA TRANSMISSION

(71) Applicant: Google Inc., Mountain View, CA (US)

(72) Inventor: Ivan Poupyrev, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 279 days.

(21) Appl. No.: 14/513,875

(22) Filed: Oct. 14, 2014

(65) Prior Publication Data

US 2016/0041618 A1 Feb. 11, 2016

Related U.S. Application Data

(60) Provisional application No. 62/034,560, filed on Aug. 7, 2014.

(51) Int. Cl.
*G06F 3/01* (2006.01)
*G01S 13/02* (2006.01)
*G01S 13/88* (2006.01)
*G01S 7/41* (2006.01)
*G06F 3/00* (2006.01)
(Continued)

(52) U.S. Cl.
CPC ............. *G06F 3/017* (2013.01); *G01S 7/415* (2013.01); *G01S 13/02* (2013.01); *G01S 13/88* (2013.01); *G06F 3/014* (2013.01)

(58) Field of Classification Search
CPC . G06F 3/01; G06F 3/011; G06F 3/014; G06F 3/017; G06F 3/03; G06F 3/041; G06F 3/042; G06F 3/0425; G06F 3/033; G01S 7/02; G01S 7/41; G01S 7/415; G01S 13/02; G01S 13/88; G01S 7/411; G01S 7/412; B60N 2/002; G02F 1/01; G02F 1/09
See application file for complete search history.

(56) References Cited

U.S. PATENT DOCUMENTS 3,610,874 A 10/1971 Gagliano
3,953,706 A 4/1976 Harris et al.
(Continued)

FOREIGN PATENT DOCUMENTS

CN 202887794 4/2013
CN 103355860 1/2016
(Continued)

OTHER PUBLICATIONS

A. Arbabian et al., "A 94-GHz mm-Wave-to-Baseband Pulsed-Radar Transceiver with Applications in Imaging and Gesture Recognition"; IEEE Journal of Solid State Circuits; year 2013; vol. 48, issue 4; pp. 1055-1071.*
(Continued)

*Primary Examiner* — Bernarr Gregory
(74) *Attorney, Agent, or Firm* — Colby Nipper

(57) ABSTRACT

This document describes techniques and devices for radar-based gesture sensing and data transmission. The techniques enable, through a radar system, seamless and intuitive control of, and data transmission between, computing devices. This radar system can both transmit data and sense gestures, thereby performing with a single system, control of many devices and data transmission with those devices. Not only can this provide control of many devices, from refrigerators to laptops, this radar system also allows high-bandwidth data transmission between devices.

20 Claims, 8 Drawing Sheets

(51) Int. Cl.
*G01S 7/00* (2006.01)
*G01S 13/00* (2006.01)

(56) References Cited

U.S. PATENT DOCUMENTS

| | | | |
|---|---|---|---|
| 4,654,967 A | 4/1987 | Thenner | |
| 4,700,044 A | 10/1987 | Hokanson et al. | |
| 4,795,998 A | 1/1989 | Dunbar et al. | |
| 4,838,797 A | 6/1989 | Dodier | |
| 5,121,124 A * | 6/1992 | Spivey | G02F 1/09 342/179 |
| 5,298,715 A | 3/1994 | Chalco et al. | |
| 5,341,979 A | 8/1994 | Gupta | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,080,690 A | 6/2000 | Lebby et al. | |
| 6,210,771 B1 | 4/2001 | Post et al. | |
| 6,254,544 B1 | 7/2001 | Hayashi | |
| 6,313,825 B1 | 11/2001 | Gilbert | |
| 6,340,979 B1 | 1/2002 | Beaton et al. | |
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,970 B1 | 2/2003 | Tabata et al. | |
| 6,543,668 B1 | 4/2003 | Fujii et al. | |
| 6,616,613 B1 | 9/2003 | Goodman | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,835,898 B2 | 12/2004 | Eldridge et al. | |
| 6,854,985 B1 | 2/2005 | Weiss | |
| 6,929,484 B2 | 8/2005 | Weiss et al. | |
| 7,134,879 B2 | 11/2006 | Sugimoto et al. | |
| 7,223,105 B2 | 5/2007 | Weiss et al. | |
| 7,249,954 B2 | 7/2007 | Weiss | |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,544,627 B2 | 6/2009 | Tao et al. | |
| 7,578,195 B2 | 8/2009 | DeAngelis et al. | |
| 7,644,488 B2 | 1/2010 | Aisenbrey | |
| 7,647,093 B2 | 1/2010 | Bojovic et al. | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,952,512 B1 | 5/2011 | Delker et al. | |
| 8,062,220 B2 | 11/2011 | Kurtz et al. | |
| 8,169,404 B1 | 5/2012 | Boillot | |
| 8,179,604 B1 | 5/2012 | Prada Gomez et al. | |
| 8,282,232 B2 | 10/2012 | Hsu et al. | |
| 8,289,185 B2 | 10/2012 | Alonso | |
| 8,301,232 B2 | 10/2012 | Albert et al. | |
| 8,334,226 B2 | 12/2012 | Nhan et al. | |
| 8,341,762 B2 | 1/2013 | Balzano | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,549,829 B2 | 10/2013 | Song et al. | |
| 8,560,972 B2 * | 10/2013 | Wilson | G06F 3/0425 345/156 |
| 8,569,189 B2 | 10/2013 | Bhattacharya et al. | |
| 8,614,689 B2 | 12/2013 | Nishikawa et al. | |
| 8,655,004 B2 | 2/2014 | Prest et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 8,819,812 B1 * | 8/2014 | Weber | G06F 3/017 726/18 |
| 9,055,879 B2 | 6/2015 | Selby et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 | 9/2015 | Zhou et al. | |
| 9,230,160 B1 * | 1/2016 | Kanter | G06F 3/033 |
| 9,331,422 B2 | 5/2016 | Nazzaro et al. | |
| 9,335,825 B2 | 5/2016 | Rautianinen et al. | |
| 9,508,141 B2 | 11/2016 | Khachaturian et al. | |
| 9,575,560 B2 * | 2/2017 | Poupyrev | G01S 13/88 |
| 9,588,625 B2 | 3/2017 | Poupyrev | |
| 9,594,443 B2 | 3/2017 | Vanblon et al. | |
| 9,600,080 B2 | 3/2017 | Poupyrev | |
| 9,693,592 B2 | 7/2017 | Robinson et al. | |
| 2002/0080156 A1 | 6/2002 | Abbott et al. | |
| 2002/0170897 A1 | 11/2002 | Hall | |
| 2003/0100228 A1 | 5/2003 | Bungo et al. | |
| 2003/0119391 A1 | 6/2003 | Swallow et al. | |
| 2004/0009729 A1 | 1/2004 | Hill et al. | |
| 2004/0259391 A1 | 12/2004 | Jung et al. | |
| 2005/0069695 A1 | 3/2005 | Jung et al. | |
| 2005/0148876 A1 | 7/2005 | Endoh et al. | |
| 2006/0035554 A1 | 2/2006 | Glaser et al. | |
| 2006/0040739 A1 | 2/2006 | Wells | |
| 2006/0157734 A1 | 7/2006 | Onodero et al. | |
| 2006/0166620 A1 * | 7/2006 | Sorensen | G06F 3/011 455/41.1 |
| 2006/0258205 A1 | 11/2006 | Locher et al. | |
| 2007/0026695 A1 | 2/2007 | Lee et al. | |
| 2007/0118043 A1 | 5/2007 | Oliver et al. | |
| 2007/0161921 A1 | 7/2007 | Rausch | |
| 2007/0176821 A1 | 8/2007 | Flom et al. | |
| 2007/0192647 A1 | 8/2007 | Glaser | |
| 2007/0197878 A1 | 8/2007 | Shklarski | |
| 2007/0210074 A1 | 9/2007 | Maurer et al. | |
| 2008/0002027 A1 | 1/2008 | Kondo et al. | |
| 2008/0024438 A1 | 1/2008 | Collins et al. | |
| 2008/0065291 A1 * | 3/2008 | Breed | B60N 2/002 701/36 |
| 2008/0134102 A1 | 6/2008 | Movold et al. | |
| 2008/0136775 A1 | 6/2008 | Conant | |
| 2008/0168396 A1 | 7/2008 | Matas et al. | |
| 2008/0194975 A1 | 8/2008 | MacQuarrie et al. | |
| 2008/0211766 A1 | 9/2008 | Westerman et al. | |
| 2008/0233822 A1 | 9/2008 | Swallow et al. | |
| 2008/0282665 A1 | 11/2008 | Speleers | |
| 2008/0291158 A1 | 11/2008 | Park et al. | |
| 2008/0316085 A1 * | 12/2008 | Rofougaran | G01S 7/412 342/22 |
| 2008/0320419 A1 | 12/2008 | Matas et al. | |
| 2009/0018408 A1 | 1/2009 | Ouchi et al. | |
| 2009/0033585 A1 | 2/2009 | Lang | |
| 2009/0053950 A1 | 2/2009 | Surve | |
| 2009/0056300 A1 | 3/2009 | Chung et al. | |
| 2009/0058820 A1 | 3/2009 | Hinckley | |
| 2009/0113298 A1 | 4/2009 | Jung et al. | |
| 2009/0115617 A1 | 5/2009 | Sano et al. | |
| 2009/0149036 A1 | 6/2009 | Lee et al. | |
| 2009/0203244 A1 | 8/2009 | Toonder | |
| 2009/0270690 A1 | 10/2009 | Roos et al. | |
| 2009/0288762 A1 | 11/2009 | Wolfel | |
| 2009/0295712 A1 | 12/2009 | Ritzau | |
| 2010/0065320 A1 | 3/2010 | Urano | |
| 2010/0071205 A1 | 3/2010 | Graumann et al. | |
| 2010/0094141 A1 | 4/2010 | Puswella | |
| 2010/0201586 A1 | 8/2010 | Michalk | |
| 2010/0205667 A1 | 8/2010 | Anderson et al. | |
| 2010/0208035 A1 | 8/2010 | Pinault et al. | |
| 2010/0225562 A1 | 9/2010 | Smith | |
| 2010/0281438 A1 | 11/2010 | Latta et al. | |

(56) References Cited

U.S. PATENT DOCUMENTS

| | | |
|---|---|---|
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0093820 A1 | 4/2011 | Zhang et al. |
| 2011/0181509 A1 | 7/2011 | Rautiainen et al. |
| 2011/0181510 A1* | 7/2011 | Hakala ............... G06F 3/017 345/158 |
| 2011/0197263 A1 | 8/2011 | Stinson, III |
| 2011/0202404 A1 | 8/2011 | van Der Riet |
| 2011/0213218 A1 | 9/2011 | Weiner et al. |
| 2011/0221666 A1 | 9/2011 | Newton et al. |
| 2011/0234492 A1* | 9/2011 | Ajmera ............... G06F 3/017 345/158 |
| 2011/0245688 A1 | 10/2011 | Arora et al. |
| 2011/0279303 A1 | 11/2011 | Smith |
| 2011/0303341 A1 | 12/2011 | Meiss et al. |
| 2011/0307842 A1 | 12/2011 | Chiang et al. |
| 2011/0318985 A1 | 12/2011 | McDermid |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1* | 11/2012 | Wang ............... G06F 3/017 345/156 |
| 2012/0310665 A1 | 12/2012 | Xu et al. |
| 2013/0016070 A1 | 1/2013 | Starner et al. |
| 2013/0053653 A1 | 2/2013 | Cuddihy et al. |
| 2013/0083173 A1 | 4/2013 | Geisner et al. |
| 2013/0102217 A1 | 4/2013 | Jeon |
| 2013/0104084 A1 | 4/2013 | Mlyniec et al. |
| 2013/0132931 A1 | 5/2013 | Bruns et al. |
| 2013/0150735 A1 | 6/2013 | Cheng |
| 2013/0161078 A1 | 6/2013 | Li |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0049487 A1 | 2/2014 | Konertz et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0191939 A1 | 7/2014 | Penn et al. |
| 2014/0200416 A1 | 7/2014 | Kashef et al. |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0297006 A1 | 10/2014 | Sadhu |
| 2014/0306936 A1 | 10/2014 | Dahl et al. |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0347295 A1 | 11/2014 | Kim et al. |
| 2014/0357369 A1 | 12/2014 | Callens et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0040040 A1 | 2/2015 | Balan et al. |
| 2015/0046183 A1 | 2/2015 | Cireddu |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091858 A1 | 4/2015 | Rosenberg et al. |
| 2015/0099941 A1 | 4/2015 | Tran |
| 2015/0100328 A1 | 4/2015 | Kress et al. |
| 2015/0112606 A1 | 4/2015 | He et al. |
| 2015/0133017 A1 | 5/2015 | Liao et al. |
| 2015/0145805 A1 | 5/2015 | Liu |
| 2015/0162729 A1 | 6/2015 | Reversat et al. |
| 2015/0199045 A1 | 7/2015 | Robucci et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0287187 A1 | 10/2015 | Redtel |
| 2015/0312041 A1 | 10/2015 | Choi |
| 2015/0332075 A1 | 11/2015 | Burch |
| 2015/0346820 A1 | 12/2015 | Poupyrev et al. |
| 2015/0375339 A1 | 12/2015 | Sterling et al. |
| 2016/0018948 A1 | 1/2016 | Parvarandeh et al. |
| 2016/0038083 A1 | 2/2016 | Ding et al. |
| 2016/0041617 A1 | 2/2016 | Poupyrev |
| 2016/0048235 A1 | 2/2016 | Poupyrev |
| 2016/0048236 A1 | 2/2016 | Poupyrev |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0145776 A1 | 5/2016 | Roh |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0249698 A1 | 9/2016 | Berzowska et al. |
| 2016/0259037 A1 | 9/2016 | Molchanov et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |

(56) References Cited

U.S. PATENT DOCUMENTS

| | | |
|---|---|---|
| 2017/0097413 A1 | 4/2017 | Gillian et al. |
| 2017/0097684 A1 | 4/2017 | Lien |
| 2017/0115777 A1 | 4/2017 | Poupyrev |
| 2017/0125940 A1 | 5/2017 | Karagozler et al. |
| 2017/0232538 A1 | 8/2017 | Robinson et al. |

FOREIGN PATENT DOCUMENTS

| | | | |
|---|---|---|---|
| DE | 102011075725 | 11/2012 | |
| DE | 102013201359 | 7/2014 | |
| EP | 0161895 | 11/1985 | |
| EP | 1815788 | 8/2007 | |
| EP | 3201726 | 8/2017 | |
| FR | 3017722 A1 * | 8/2015 | ............ G06F 3/011 |
| GB | 2070469 | 9/1981 | |
| GB | 2443208 | 4/2008 | |
| JP | 2006234716 | 9/2006 | |
| JP | 2011102457 | 5/2011 | |
| WO | WO-9001895 | 3/1990 | |
| WO | WO-0127855 | 4/2001 | |
| WO | WO-0130123 | 4/2001 | |
| WO | WO-0175778 | 10/2001 | |
| WO | WO-02082999 | 10/2002 | |
| WO | WO-2005033387 | 4/2005 | |
| WO | 2007125298 | 11/2007 | |
| WO | WO-2008061385 | 5/2008 | |
| WO | WO-2009032073 | 3/2009 | |
| WO | WO-2010032173 | 3/2010 | |
| WO | WO-2012026013 | 3/2012 | |
| WO | WO-2012152476 | 11/2012 | |
| WO | WO-2013082806 | 6/2013 | |
| WO | WO-2013084108 | 6/2013 | |
| WO | WO-2013186696 | 12/2013 | |
| WO | WO-2013191657 | 12/2013 | |
| WO | WO-2013192166 | 12/2013 | |
| WO | WO-2014019085 | 2/2014 | |
| WO | WO-2014116968 | 7/2014 | |
| WO | WO-2014124520 | 8/2014 | |
| WO | WO-2014136027 | 9/2014 | |
| WO | WO-2014138280 | 9/2014 | |
| WO | WO-2014160893 | 10/2014 | |
| WO | WO-2014165476 | 10/2014 | |
| WO | WO-2014204323 | 12/2014 | |
| WO | WO-2015017931 | 2/2015 | |
| WO | WO-2015022671 | 2/2015 | |
| WO | 2016053624 | 4/2016 | |

OTHER PUBLICATIONS

"International Search Report and Written Opinion", Application No. PCT/US2016/029820, Jul. 15, 2016, 14 pages.
"Non-Final Office Action", U.S. Appl. No. 14/582,896, Jun. 29, 2016, 9 pages.
"Non-Final Office Action", U.S. Appl. No. 14/681,625, Aug. 12, 2016, 9 pages.
"Restriction Requirement", U.S. Appl. No. 14/666,155, Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
"Philips Vital Signs Camera", Retrieved From: <http://www.vitalsignscamera.com/> Apr. 15, 2015, Jul. 17, 2013, 2 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=
http%3A%2F%2Fwww%2Eopticsinfobase%2Eorg%2FDirect-PDFAccess%2F77B04D55%2DBC95%2D6937
&2D5BAC49A426378C02%5F199381%2Foe%2D18%2D10-
%2D10762%2Ep, May 7, 2010, 13 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
He, "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Nakajima, et al., "Development of Real-Time Image Sequence Analysis for Evaluating Posture Change and Respiratory Rate of a Subject in Bed", In Proceedings: Physiological Measurement, vol. 22, No. 3, Retrieved From: <http://iopscience.iop.org/0967-3334/22/3/401/pdf/0967-3334_22_3_401.pdf> Feb. 27, 2015, Aug. 2001, 8 pages.
"International Search Report and Written Opinion", Application No. PCT/US2015/043963, Nov. 24, 2015, 16 pages.
"International Search Report and Written Opinion", Application No. PCT/US2015/043949, Dec. 1, 2015, 18 pages.
Zhadobov,"Millimeter-wave Interactions with the Human Body: State of Knowledge and Recent Advances", International Journal of Microwave and Wireless Technologies, Mar. 1, 2011, 11 pages.
"Extended European Search Report", EP Application No. 15170577.9, Nov. 5, 2015, 12 pages.
"Final Office Action", U.S. Appl. No. 14/312,486, Jun. 3, 2016, 32 pages.
"Final Office Action", U.S. Appl. No. 14/504,038, Sep. 27, 2016, 23 pages.
"Final Office Action", U.S. Appl. No. 14/504,061, Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, Nov. 3, 2015, 12 pages.
"International Search Report and Written Opinion", Application No. PCT/US2016/024267, Jun. 20, 2016, 13 pages.
"International Search Report and Written Opinion", Application No. PCT/US2016/024273, Jun. 20, 2016, 13 pages.
"International Search Report and Written Opinion", Application No. PCT/US2016/032307, Aug. 25, 2016, 13 pages.
"International Search Report and Written Opinion", Application No. PCT/US2016/030177, Aug. 2, 2016, 15 pages.
"International Search Report and Written Opinion", Application No. PCT/US2016/030115, Aug. 8, 2016, 18 pages.
"Non-Final Office Action", U.S. Appl. No. 14/312,486, Oct. 23, 2015, 25 pages.
"Non-Final Office Action", U.S. Appl. No. 14/504,061, Nov. 4, 2015, 8 pages.
"Non-Final Office Action", U.S. Appl. No. 14/666,155, Aug. 24, 2016, 9 pages.
"Non-Final Office Action", U.S. Appl. No. 14/930,220, Sep. 14, 2016, 15 pages.
"Notice of Allowance", U.S. Appl. No. 14/504,061, Sep. 12, 2016, 7 pages.
Arbabian,"A 94GHz mm—Wave to Baseband Pulsed-Radar for Imaging and Gesture Recognition", 2012 IEEE, 2012 Symposium on VLSI Circuits Digest of Technical Papers, 2012, 2 pages.

(56) References Cited

OTHER PUBLICATIONS

Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
Holleis,"Evaluating Capacitive Touch Input on Clothes", Proceedings of the 10th International Conference on Human Computer Interaction, Jan. 1, 2008, 10 pages.
Patel,"Applications of Electrically Conductive Yarns in Technical Textiles", International Conference on Power System Technology (POWECON), Oct. 30, 2012, 6 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhang,"Study of the Structural Design and Capacitance Characteristics of Fabric Sensor", Advanced Materials Research (vols. 194-196), Feb. 21, 2011, 8 pages.
"International Search Report and Written Opinion", Application No. PCT/US2015/050903, Feb. 19, 2016, 18 pages.
"Non-Final Office Action", U.S. Appl. No. 14/504,038, Feb. 26, 2016, 22 pages.
Pu,"Whole-Home Gesture Recognition Using Wireless Signals", MobiCom '13 Proceedings of the 19th annual international conference on Mobile computing & networking, Aug. 27, 2013, 12 pages.
"Corrected Notice of Allowance", U.S. Appl. No. 14/312,486, Oct. 28, 2016, 4 pages.
"Final Office Action", U.S. Appl. No. 14/681,625, Dec. 7, 2016, 10 pages.
"International Search Report and Written Opinion", Application No. PCT/US2016/024289, Aug. 25, 2016, 17 pages.
"International Search Report and Written Opinion", Application No. PCT/US2016/033342, Oct. 27, 2016, 20 pages.
"Non-Final Office Action", U.S. Appl. No. 14/518,863, Oct. 14, 2016, 16 pages.
"Notice of Allowance", U.S. Appl. No. 14/312,486, Oct. 7, 2016, 15 pages.
"Notice of Allowance", U.S. Appl. No. 14/582,896, Nov. 7, 2016, 5 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Matthews,"Venous Pulse", Retrieved at: http://www.rjmatthewsmd.com/Definitions/venous_pulse.htm—on Nov. 30, 2016, Apr. 13, 2013, 7 pages.
Pu,"Gesture Recognition Using Wireless Signals", Oct. 2014, pp. 15-18.
Schneegass,"Towards a Garment OS: Supporting Application Development for Smart Garments", Wearable Computers, ACM, Sep. 2014, 6 pages.
"Corrected Notice of Allowance", U.S. Appl. No. 14/504,061, Dec. 27, 2016, 2 pages.
"Corrected Notice of Allowance", U.S. Appl. No. 14/582,896, Dec. 19, 2016, 2 pages.
"International Search Report and Written Opinion", Application No. PCT/US2016/042013, Oct. 26, 2016, 12 pages.
"Non-Final Office Action", U.S. Appl. No. 14/504,121, Jan. 9, 2017, 13 pages.
"Corrected Notice of Allowance", U.S. Appl. No. 14/312,486, Jan. 23, 2017, 4 pages.
"Corrected Notice of Allowance", U.S. Appl. No. 14/582,896, Feb. 6, 2017, 2 pages.
"Corrected Notice of Allowance", U.S. Appl. No. 14/582,896, Feb. 23, 2017, 2 pages.
"Corrected Notice of Allowance", U.S. Appl. No. 14/930,220, Mar. 20, 2017, 2 pages.
"International Preliminary Report on Patentability", Application No. PCT/US2015/043963, Feb. 16, 2017, 12 pages.
"International Preliminary Report on Patentability", Application No. PCT/US2015/030388, Dec. 15, 2016, 12 pages.
"International Preliminary Report on Patentability", Application No. PCT/US2015/043949, Feb. 16, 2017, 13 pages.
"International Preliminary Report on Patentability", Application No. PCT/US2015/044774, Mar. 2, 2017, 8 pages.
"International Search Report and Written Opinion", Application No. PCT/US2016/062082, Feb. 23, 2017, 12 pages.
"International Search Report and Written Opinion", Application No. PCT/US2016/055671, Dec. 1, 2016, 14 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 14/504,038, Mar. 22, 2017, 33 pages.
"Non-Final Office Action", U.S. Appl. No. 14/504,139, Jan. 27, 2017, 10 pages.
"Non-Final Office Action", U.S. Appl. No. 14/666,155, Feb. 3, 2017, 12 pages.
"Non-Final Office Action", U.S. Appl. No. 14/681,625, Mar. 6, 2017, 7 pages.
"Non-Final Office Action", U.S. Appl. No. 14/874,955, Feb. 27, 2017, 8 pages.
"Non-Final Office Action", U.S. Appl. No. 14/959,799, Jan. 27, 2017, 10 pages.
"Non-Final Office Action", U.S. Appl. No. 15/398,147, Mar. 9, 2017, 10 pages.
"Notice of Allowance", U.S. Appl. No. 14/930,220, Feb. 2, 2017, 8 pages.
"Pre-Interview Communication", U.S. Appl. No. 14/494,863, Jan. 27, 2017, 5 pages.
"Pre-Interview Communication", U.S. Appl. No. 14/715,793, Mar. 20, 2017, 3 pages.
"Pre-Interview Communication", U.S. Appl. No. 14/959,730, Feb. 15, 2017, 3 pages.
"Pre-Interview Communication", U.S. Appl. No. 14/959,901, Feb. 10, 2017, 3 pages.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
Palese,"The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, 2013, pp. 8-12.
Stoppa,"Wearable Electronics and Smart Textiles: A Critical Review", In Proceedings of Sensors, vol. 14, Issue 7, Jul. 7, 2014, pp. 11957-11992.
"Combined Search and Examination Report", GB Application No. 1620892.8, Apr. 6, 2017, 5 pages.
"Final Office Action", U.S. Appl. No. 14/518,863, May 5, 2017, 18 pages.
"First Action Interview Office Action", U.S. Appl. No. 14/959,901, Apr. 14, 2017, 3 pages.
"International Search Report and Written Opinion", Application No. PCT/US2016/060399, Jan. 30, 2017, 11 pages.
"Non-Final Office Action", U.S. Appl. No. 15/403,066, May 4, 2017, 31 pages.
"Pre-Interview Communication", U.S. Appl. No. 14/715,454, Apr. 14, 2017, 3 pages.
"Pre-Interview Communication", U.S. Appl. No. 15/343,067, Apr. 19, 2017, 3 pages.
"Combined Search and Examination Report", GB Application No. 1620891.0, dated May 31, 2017, 9 pages.

(56) References Cited

OTHER PUBLICATIONS

"Corrected Notice of Allowance", U.S. Appl. No. 14/930,220, dated May 11, 2017, 2 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"First Action Interview Pilot Program Pre-Interview Communication", U.S. Appl. No. 14/731,195, dated Aug. 1, 2017, 3 pages.
"International Search Report and Written Opinion", Application No. PCT/US2016/063874, dated May 11, 2017, 19 pages.
"Non-Final Office Action", U.S. Appl. No. 14/720,632, dated Jun. 14, 2017, 16 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/494,863, dated May 30, 2017, 7 pages.
"Notice of Allowance", U.S. Appl. No. 14/681,625, Jun. 7, 2017, 7 pages.
Otto, et al., "System Architecture of a Wireless Body Area Sensor Network for Ubiquitous Health Monitoring", Journal of Mobile Multimedia; vol. 1, No. 4, Jan. 10, 2006, 20 pages.
"Advisory Action", U.S. Appl. No. 14/504,139, dated Aug. 28, 2017, 3 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,901, dated Aug. 25, 2017, 19 pages.
"Final Office Action", U.S. Appl. No. 14/715,454, dated Sep. 7, 2017, 14 pages.
"Final Office Action", U.S. Appl. No. 14/715,793, dated Sep. 12, 2017, 7 pages.
"First Action Interview OA", U.S. Appl. No. 14/715,793, dated Jun. 21, 2017, 3 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Notice of Allowance", U.S. Appl. No. 14/666,155, dated Jul. 10, 2017, 7 pages.
"Pre-Interview Office Action", U.S. Appl. No. 14/862,409, dated Sep. 15, 2017, 16 pages.

* cited by examiner

RADAR-BASED GESTURE SENSING AND DATA TRANSMISSION

PRIORITY APPLICATION

This application claims priority under 35 U.S.C. §119(e) to U.S. Provisional Patent Application No. 62/034,560, entitled "Radar-Based Gesture Sensing and Data Transmission" and filed on Aug. 7, 2014, the disclosure of which is incorporated in its entirety by reference herein.

BACKGROUND

With the proliferation of computing devices in nearly every aspect of modern life—from automobiles to home appliances—users increasingly desire seamless and intuitive ways to control these many devices. Because of this need, control devices have proliferated for these computing devices, such as a television's remote, a gaming system's gesture-sensing camera, a tablet computer's touch screen, a desktop computer's keyboard, a smart-phone's audio-based controller, or a microwave oven's button control pad. This conventional use of many control devices is expensive and fails to provide seamless and intuitive control desired by users.

This proliferation of computing devices has also increased many user's desire to integrate communication between these devices, such as to pass a song from a smart phone with limited audio capabilities to a home stereo system or a television program from a tablet computer with a small screen to a large-screen television.

SUMMARY

This document describes techniques and devices for radar-based gesture sensing and data transmission. The techniques enable, through a radar system, seamless and intuitive control of, and data transmission between, computing devices. This radar system can both transmit data and sense gestures, thereby performing with a single system, control of many devices and data transmission with those devices. Not only can this provide control of many devices, from refrigerators to laptops, this radar system also allows high-bandwidth data transmission between devices.

This summary is provided to introduce simplified concepts concerning radar-based gesture sensing and data transmission, which are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for radar-based gesture sensing and data transmission are described with reference to the following drawings. The same numbers are used throughout the drawings to reference like features and components.

DETAILED DESCRIPTION

Overview

This document describes techniques and devices enabling radar-based gesture sensing and data transmission. These techniques and devices enable users to control and transmit data with a radar system rather than multiple different kinds of control devices, thereby permitting users to learn one simple system rather than many different systems to control their devices. Further, these techniques and devices also enable data transmission with this radar system, thereby reducing costs not only by reducing the number and type of control devices, but also by replacing other data transmission systems.

Consider, for example, a user that wishes to transmit a playlist of songs from her smartphone to her stereo system. Assume that, in one room of her home, she has three radar-sensitive devices, the stereo system, a television, and a thermostat to control her apartment's heating and cooling. She may simply point her smartphone in the direction of her stereo system and then make a hand gesture between her smartphone and her stereo system, such as a hand-swipe from her smartphone toward her stereo system. The techniques can determine, based on this pointing and gesture, to transmit the playlist of songs from her smartphone through the radar system and to her stereo system. The radar system may also enable her to continue to control her stereo system by sensing gestures in a radar field (even the radar field transmitting data to the stereo system), such as to pause a song or turn up the stereo system's volume.

Example Environment

Figure 1:
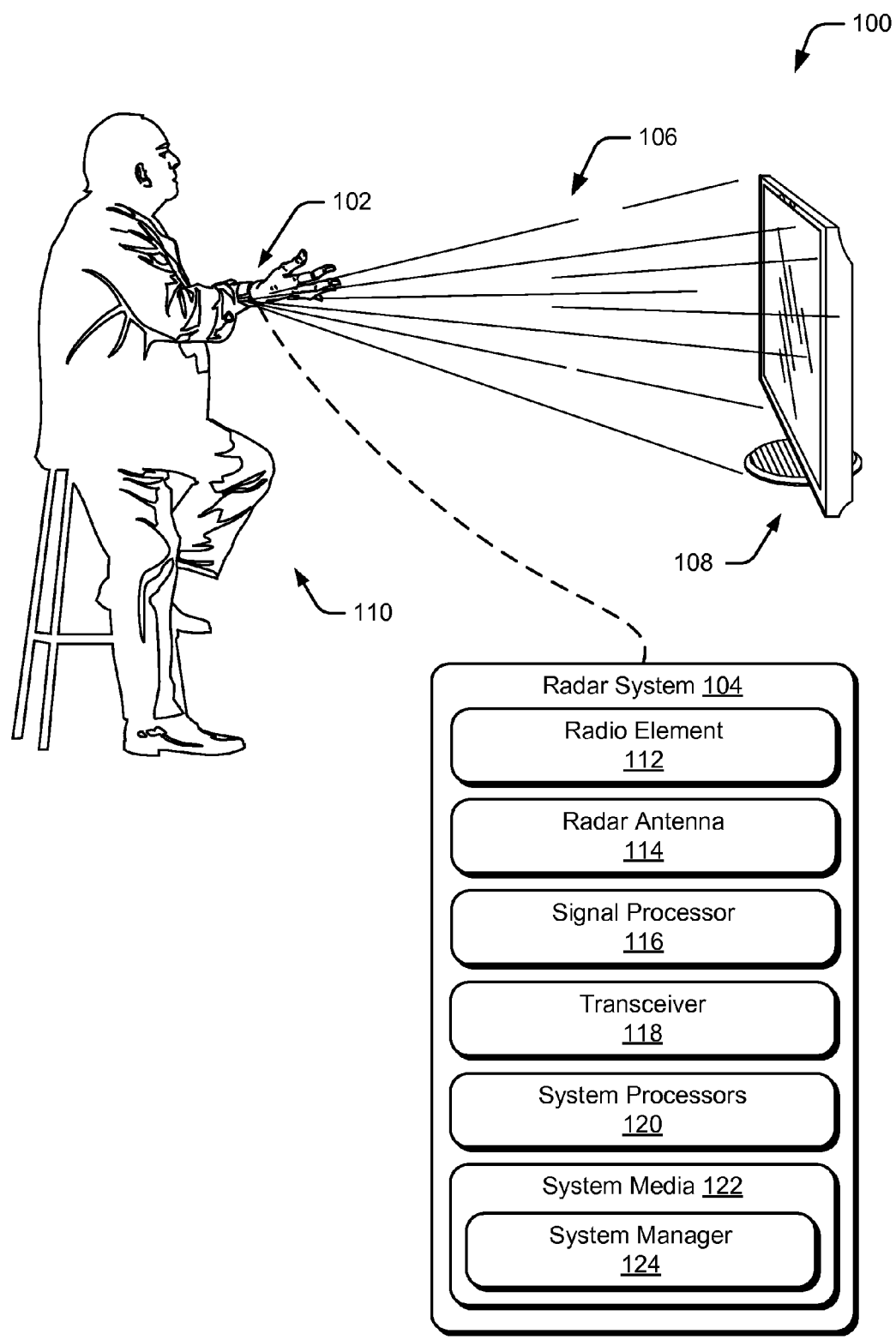
FIG. 1 illustrates an example environment in which radar-based gesture sensing and data transmission can be implemented.

FIG. 1 is an illustration of an example environment 100 in which techniques using, and an apparatus including, a radar system for gesture sensing and data transmission may be embodied. Environment 100 includes a radar-communication device 102 having a radar system 104, a radar transmission 106 provided by radar system 104, and a receiving device 108, which receives radar transmission 106. As shown, a user 110 points his radar-communication device 102 in a direction of receiving device 108. With this direction and a gesture that interacts with radar transmission 106 (described below), the techniques establish communication with, or control of, receiving device 108.

Radar system 104 is configured to transmit data and to sense gestures. To enable this, radar system 104 includes a radio element 112, a radar antenna 114, a signal processor 116, a transceiver 118, system processors 120, system media 122, and a system manager 124.

Generally, radio element 112 is configured to provide a radar transmission capable of transmitting data. Radio element 112 can be configured to emit continuously modulated radiation, ultra-wideband radiation, and/or sub-millimeter-frequency radiation. Radio element 112, in some cases, is configured to form radiation in beams, the beams aiding a receiving device, and/or radar antenna 114 and signal processor 116, to determine which of the beams are interrupted, and thus locations of interactions within a field having the radar transmission. In some cases, radio element 112 is configured to transmit radar that penetrates fabric or other obstructions and reflect from human tissue. These fabrics or obstructions can include wood, glass, plastic, cotton, wool, nylon and similar fibers, and so forth, while reflecting from human tissues, such as a person's hand, thereby potentially improving gesture recognition as clothing or other obstructions can be overcome.

In more detail, radio element 112 can be configured to emit microwave radiation in a 1 GHz to 300 GHz range, a 3 GHz to 100 GHz range, and narrower bands, such as 57 GHz to 63 GHz. This frequency range affects radar antenna 114's ability to receive interactions, such as to track locations of two or more targets to a resolution of about two to about 25 millimeters. Radio element 112 can be configured, along with other entities of radar system 104, to have a relatively fast update rate, which can aid in resolution of the interactions.

By selecting particular frequencies, radar system 104 can operate to substantially penetrate clothing while not substantially penetrating human tissue. Further, radar antenna 114 or signal processor 116 can be configured to differentiate between interactions in the radar field caused by clothing from those interactions in the radar field caused by human tissue. Thus, a person wearing gloves or a long sleeve shirt that could interfere with sensing gestures with some conventional techniques, can still be sensed with radar system 104.

Radar antenna 114 is configured to sense interactions in the radar transmissions and signal processor 116 is configured to process the sensed interactions sufficient to provide gesture data usable to determine a gesture from the sensed interactions. In some cases interactions are also or instead sensed by a receiving device, which is described later below. Radar antenna 114 can include one or many sensors, such as an array of radiation sensors, the number in the array based on a desired resolution and the type or types of radar being transmitted. Radar antenna 114 is configured to receive reflections of the radar transmission, including those caused by two or more targets (e.g., fingers), and signal processor 116 is configured to process the sensed interactions sufficient to provide data usable to determine gestures.

Figure 2:
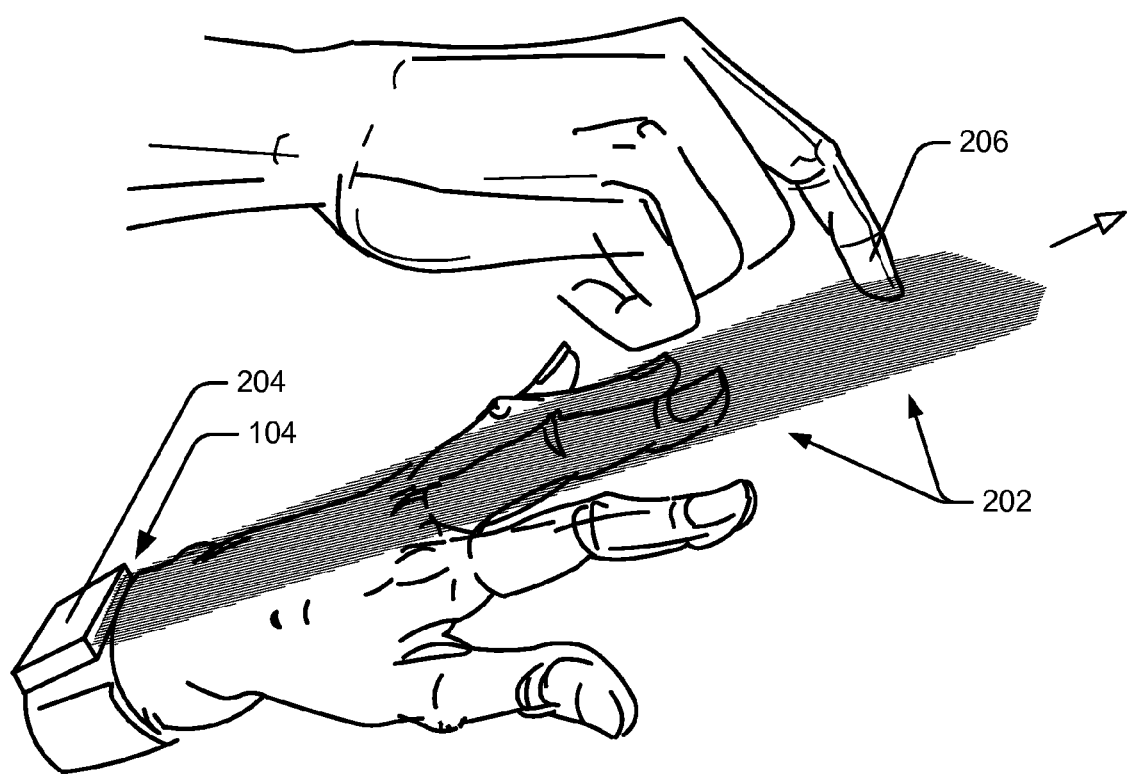
FIG. 2 illustrates an example radar transmission emitted by a radar system of a wearable computing device.

An example of a radar transmission and a gesture interaction within that radar transmission is illustrated in FIG. 2, which shows radar transmission 202 emitted by radar system 104 of a wearable computing device. In this particular example, the wearable computing device is illustrated as wearable computing bracelet 204, though any suitable computing device, wearable or otherwise, may implement the techniques described herein. Radar transmission 202 is interacted with by a person's finger 206, which causes a refection (not shown) in radar transmission 202. This reflection, as noted, can be received and processed to provide data from which a gesture is determined.

Figure 3:
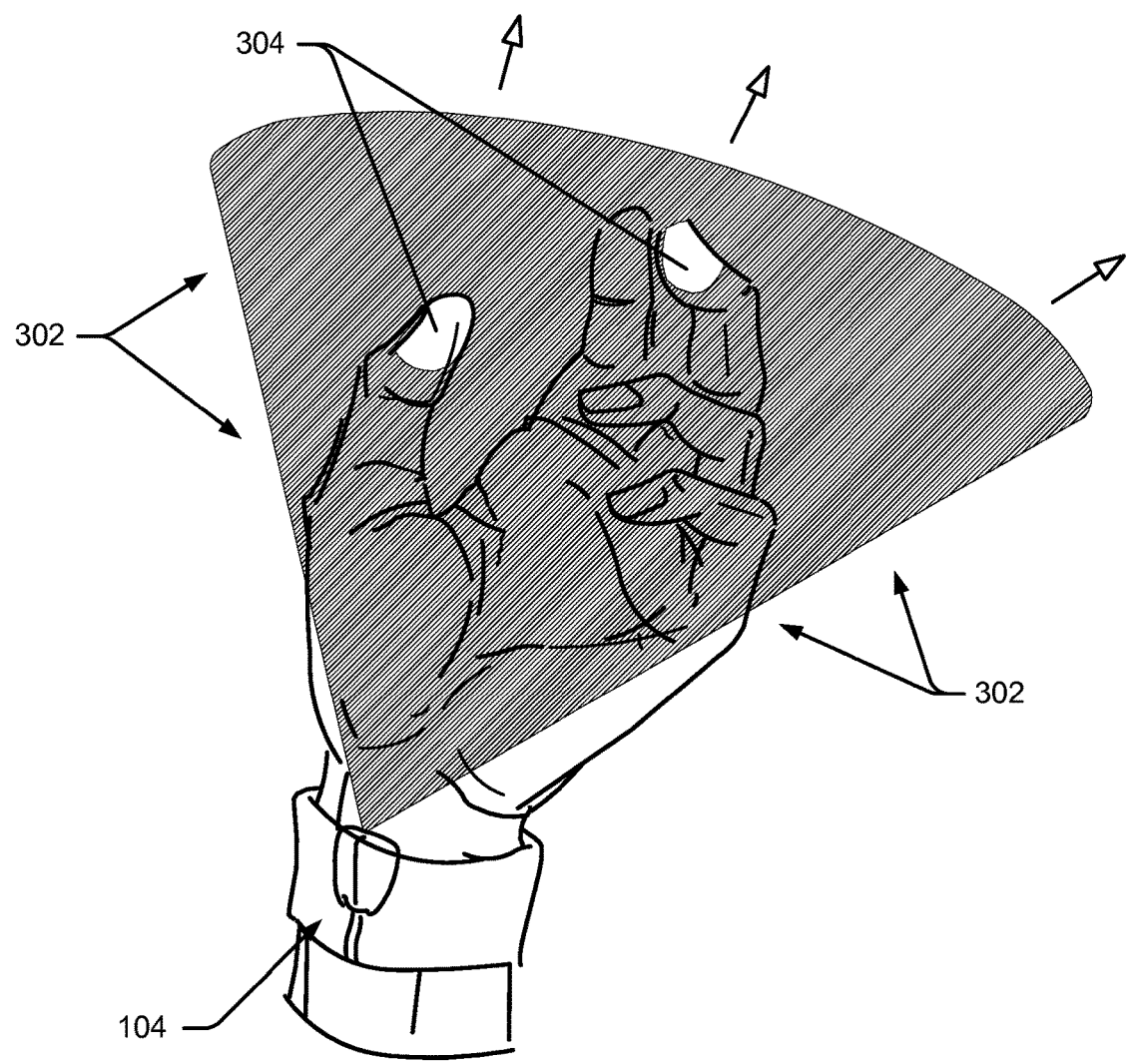
FIG. 3 illustrates an example radar transmission emitted by a radar system and interacted with by a finger of a user.

By way of a second example, consider FIG. 3, which illustrates a radar transmission 302 (the transmission shown truncated) emitted by radar system 104, which here is not part of a computing device. This radar transmission 302 is shown interacted with by fingers 304, which again causes reflections in radar transmission 302.

A user may perform complex or simple gestures with a hand or fingers (or a device like a stylus) that interrupts the radar transmission. Example gestures include the many gestures usable with current touch-sensitive displays, such as swipes, two-finger pinch and spread, tap, and so forth. Other gestures are enabled that are complex, or simple but three-dimensional, examples include many sign-language gestures, e.g., those of American Sign Language (ASL) and other sign languages worldwide. A few of these include an up-and-down fist, which in ASL means "Yes", an open index and middle finger moving to connect to an open thumb, which means "No", a flat hand moving up a step, which means "Advance", a flat and angled hand moving up and down, which means "Afternoon", clenched fingers and open thumb moving to open fingers and an open thumb, which means "taxicab", an index finger moving up in a roughly vertical direction, which means "up", and so forth. These are but a few of many gestures that can sensed by radar system 104.

Returning to FIG. 1, radar system 104 may include transceiver 118, which in some cases aids in communicating in manners other than through radar. In cases where radar system 104 is included with a computing device, transceiver 118 may not be used. As noted gesture data can be transmitted through radio element 112 or transceiver 118. This gesture data can be provided in a format usable by a receiving device sufficient for the receiving device to determine the gesture in those cases where the gesture is not determined by radar system 104 or a computing device into which radar system 104 is integrated.

Radar system 104 may include one or more system processors 120 and system media 122 (e.g., one or more computer-readable storage media). System media 122 includes system manager 124, which can perform various operations, including determining a gesture based on gesture data from signal processor 116, mapping the determined gesture to a pre-configured control gesture associated with a control input associated with a receiving device, and causing radio element 112 or transceiver 118 to transmit the control input to the receiving device effective to enable control of the device. This is but one of the ways in which the above-mentioned control through radar system 104 can be enabled. Operations of system manager 224 are described in greater detail as part of methods 600 and 700 below.

Figure 4:
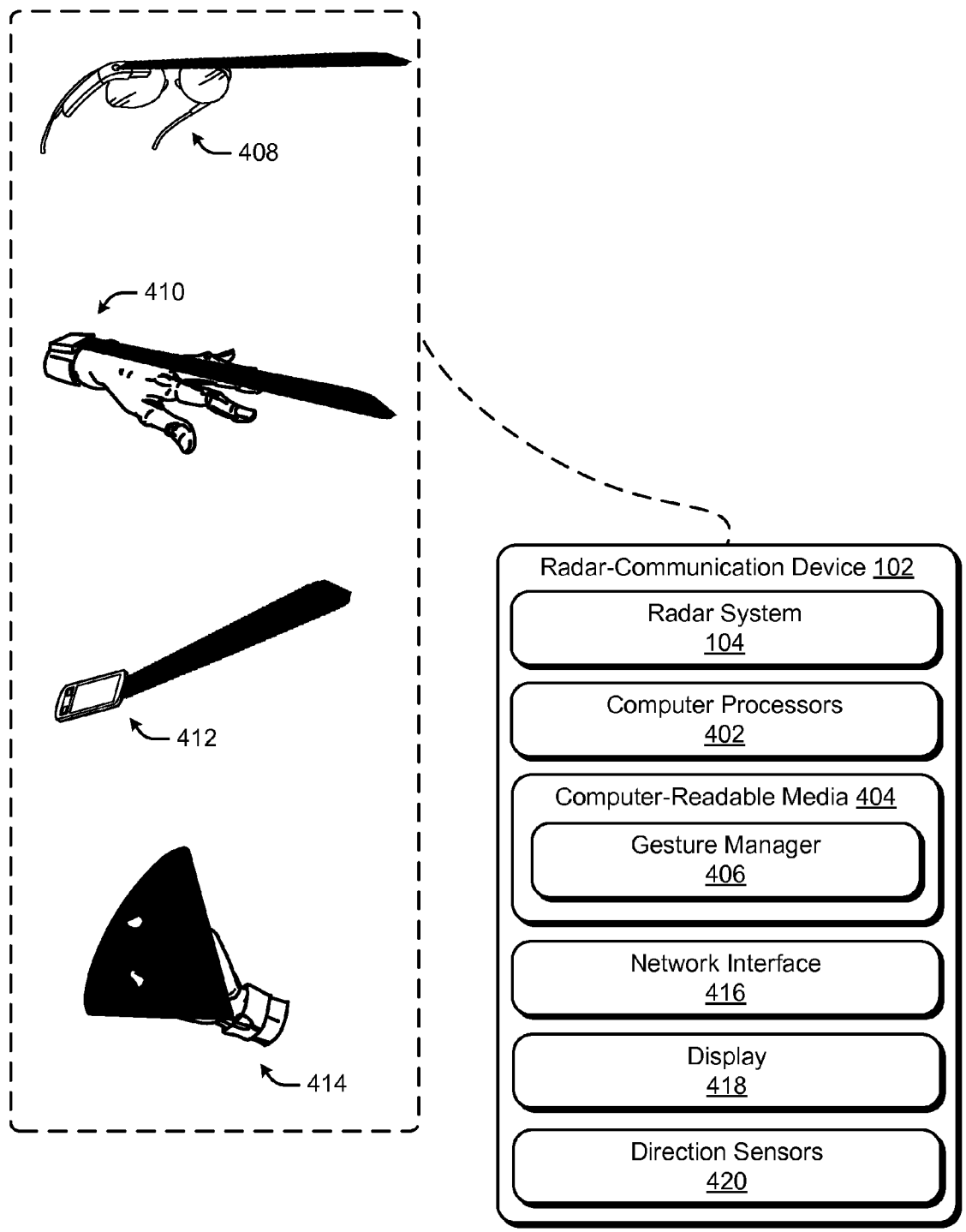
FIG. 4 illustrates an example radar communication device having the radar system of FIG. 1.

Radar system 104 can be used with, or embedded within, many different garments, accessories, and computing devices. Consider, for example, FIG. 4, which illustrates radar-communication device 102 in greater detail. Radar-communication device 102 includes radar system 104, one or more computer processors 402, and computer-readable media 404, which includes memory media and storage media. Applications and/or an operating system (not shown) embodied as computer-readable instructions on computer-readable media 404 can be executed by processors 402 to provide some of the functionalities described herein. Computer-readable media 404 also includes gesture manager 406 (described below). Example radar-communication devices 102 include computing devices, such as computing spectacles 408, a computing bracelet 410 (e.g., smart watch), and a smart phone 412. Devices having little or no computing may also be used, including radar transmitter 414, which includes a network interface 416, but may or may not include computer processors 402, gesture manager 406, display 418, and direction sensors 420.

Direction sensors 420 are capable of sensing a user's directional selection through various input manners and devices, which range from buttons, capacitive sensors, radar fields, and touch screens to orientation sensors capable of determining an orientation or orientation change of radar-communication device 102. Further, direction can be sensed without movement of radar-communication device 102, such as through gestures made within a radar transmission or other non-directional selection. For a radar transmission that can be received by multiple devices, selection of the receiving device can be made without changing the direction but instead making a gesture in the radar field that indicates selection of the intended receiving device. This gesture can be directional to the device—such as movement from radar-communication device 102 toward receiving device 108, or be a gesture associated with the particular device.

Buttons, capacitive sensors, and touch screens enable a user to select receiving devices or controls of a receiving device, such as to increase a volume or pause a program with a button associated with that control on radar-communication device 102 (e.g., a button on radar-communication device 102 for altering volume can be used to control receiving device 108). Touch screens or pads enable a user to select controls and devices with visual controls similar to the buttons but also through zooming gestures, such as a pinch gesture to zoom out or a spread gesture to zoom in. Cameras and orientation sensors can determine selections that tilt, turn, move in, move out, move up, move left, move right, and move down radar-communication device 102, to name just a few.

Direction sensors 420 may also include orientations sensors, which can include micromachined accelerometers, which may also be referred to as microelectromechanical system (MEMS) based accelerometers. These micromachined accelerometers, depending on the types, are configured to measure, in multiple axes, magnitude and direction of proper acceleration (e.g., G-force) as a vector quantity. By so doing, the micromachined accelerometers can sense orientation, coordinate acceleration, vibration, shock, and falling. For use as orientation sensors, these micromachined accelerometers can sense six degrees of freedom of radar-communication device 102, including three degrees of freedom in translation (X, Y, and Z) and three in rotation (pitch, yaw, and roll). Cameras can be used to track a device's location, such as relative to a user viewing the display, by tracking imaged objects (e.g., a book pictured by the camera can be used to determine, based on the book changing size or location in an image captured by the camera, an orientation or location in three dimensions of the display) or objects that relate to the viewer, such as by tracking a user's facial features (e.g., eyes, cornea, irises).

Radar-communication device 102 may implement little or no computer software, such as when configured as radar transmitter 414. In addition to the example device shown, radar-communication device 102 may also be implemented as other small wearable devices, such as a ring, bracelet, or broach or small handheld remote controllers and so forth.

Figure 5:
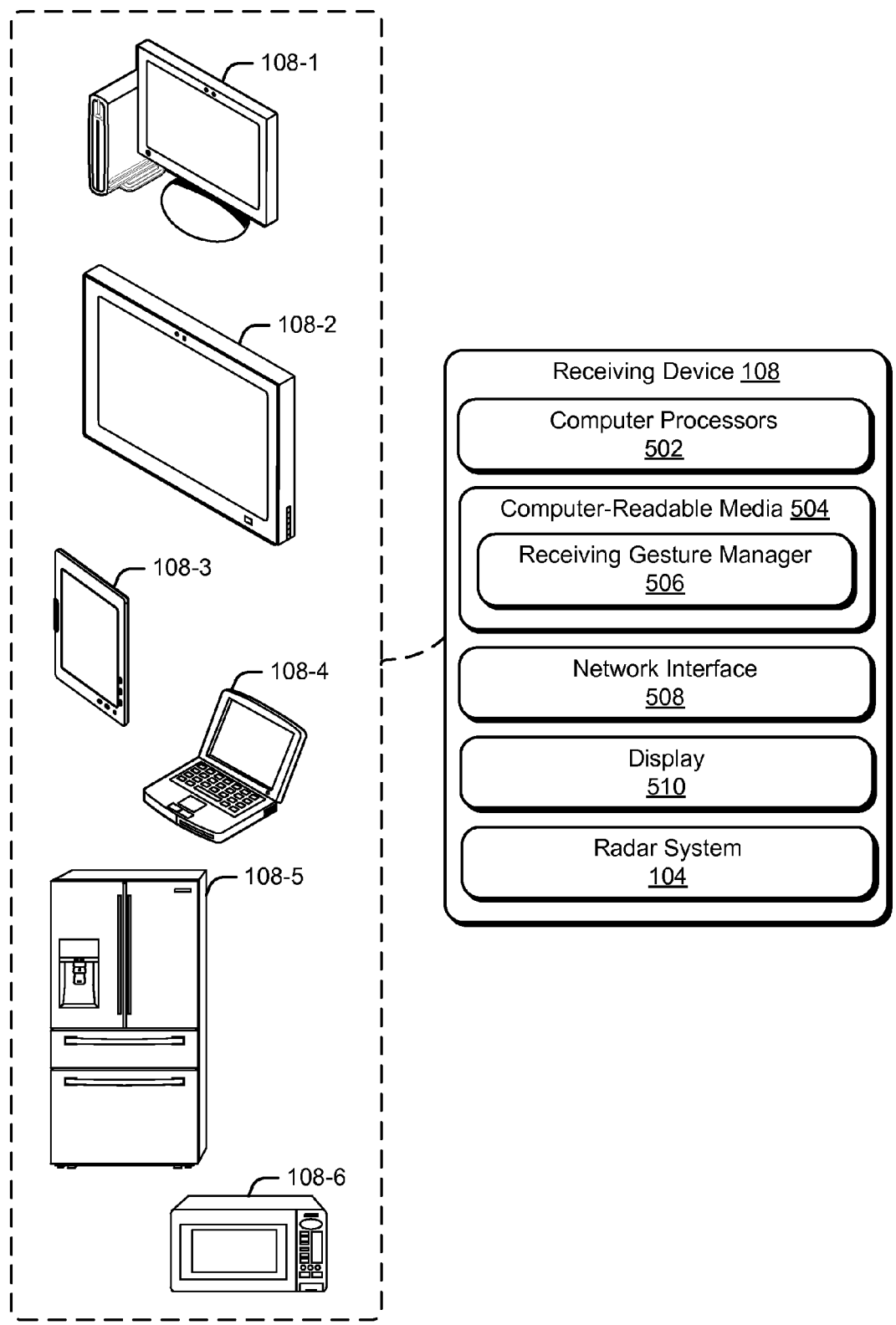
FIG. 5 illustrates an example receiving device having the radar system of FIG. 1.

As noted above, radar-communication device 102, using radar system 104, communicates with a receiving device, such as receiving device 108 of FIG. 1. In more detail, consider FIG. 5, which illustrates an example receiving device 108. Receiving device 108 is illustrated with various non-limiting example devices, desktop computer 108-1, a television 108-2, a tablet 108-3, a laptop 108-4, a refrigerator 108-5, and a microwave 108-6, though other devices may also be used, such as home automation and control systems, entertainment systems, audio systems, other home appliances, security systems, netbooks, smartphones, and e-readers.

Receiving device 108 includes one or more computer processors 502 and computer-readable storage media (storage media) 504. Storage media 504 includes applications and/or an operating system (not shown) embodied as computer-readable instructions executable by computer processors 502 to provide, in some cases, functionalities described herein. Storage media 504 also includes receiving gesture manager 506 (described below).

Receiving device 108 may also include network interfaces 508 for communicating data over wired, wireless, or optical networks. By way of example and not limitation, network interface 508 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. Receiving device 108 includes a display 510, which can be touch-sensitive, though this is not required.

Receiving gesture manager 506 is capable of interacting with applications and devices associated with or through which receiving device 108 is able to communicate and radar system 104 effective to control and/or alter data communications between various devices or applications.

Receiving device 108 is also shown including radar system 104, which can be included in whole or in part. In some cases, receiving device 108 receives reflections from gesture interactions in radar transmissions (e.g., radar transmissions of other devices), and thus can sense gestures within the radar field of the radar transmissions. In such cases, receiving device 108 includes radar antenna 114 and signal processor 116 as described above. Further, receiving device 108 may receive and transmit data using radar, in such cases radio element 112 is also included in receiving device 108. In conjunction with these and/or other elements of radar system 104 operating at receiving device 108, receiving gesture manager 506 is capable of determining gestures based on interactions to radar transmission 106.

As will be described in greater detail below, radar transmissions can enable data communication between (e.g., one-way or bi-directional transmissions) radar-communication device 102 and receiving device 108, as well as sensing of gestures made within the radar transmissions.

These and other capabilities and configurations, as well as ways in which entities of FIGS. 1-5 act and interact, are set forth in greater detail below. These entities may be further divided, combined, and so on. The environment 100 of FIG. 1 and the detailed illustrations of FIGS. 2-5 illustrate some of many possible environments and devices capable of employing the described techniques.

Example Methods

Figure 6:
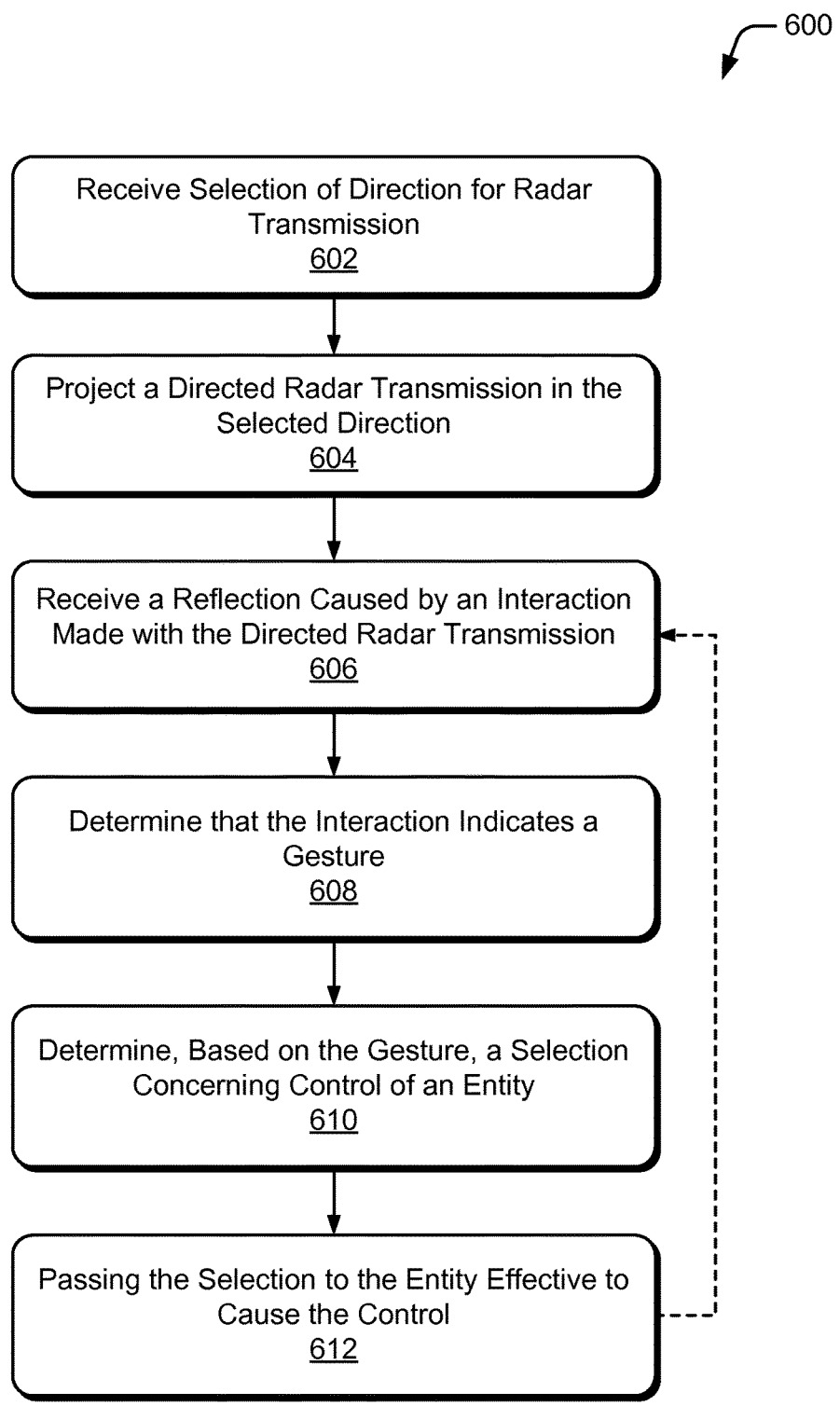
FIG. 6 illustrates an example method enabling radar-based gesture sensing and data transmission from a radar-communication device.
Figure 7:
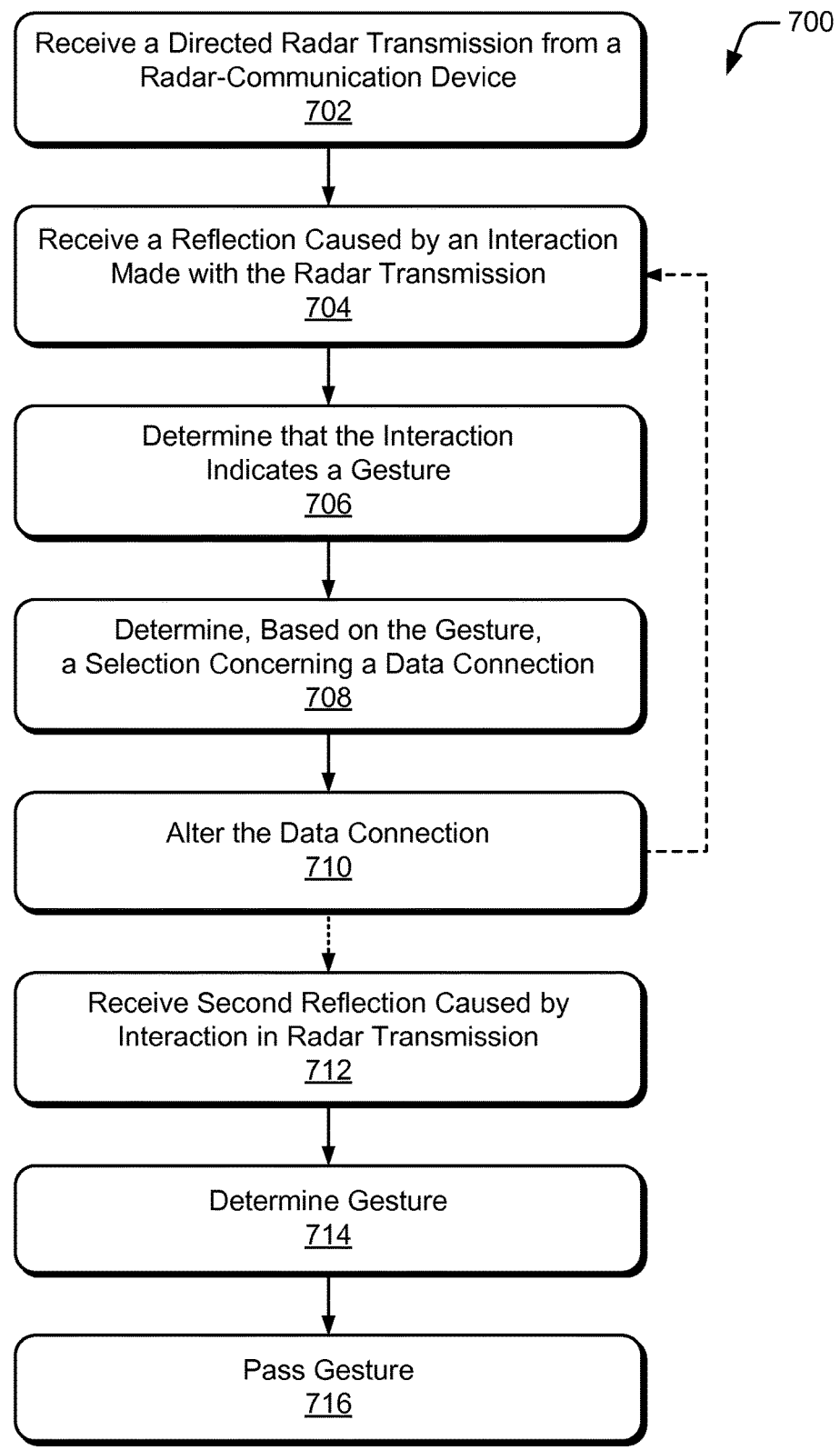
FIG. 7 illustrates another example method enabling radar-based gesture sensing and data transmission performed at a receiving device.

FIGS. 6 and 7 depict methods enabling radar-based gesture sensing and data transmission. These methods and other methods herein are shown as sets of blocks that specify operations performed but are not necessarily limited to the order or combinations shown for performing the operations by the respective blocks. In portions of the following discussion reference may be made to environment 100 of FIG. 1 and entities detailed in FIGS. 2-5, reference to which is made for example only. The techniques are not limited to performance by one entity or multiple entities operating on one device.

At 602, selection of a direction for projection of a radar transmission is received. This selection can be, as noted, through a physical orienting of a radar element of a radar-communication device toward a radar antenna associated with a computing device. Selection can made by a user, such as user 110 of FIG. 1, to point or otherwise select a direction for the radar transmission. As shown in FIG. 1, user 110 points radar-communication device 102 toward receiving device 108. This selection can be sensed by radar-communication device 102 through various manners, such as through direction sensors 420 to sense an orientation of radar-communication device 102 as noted above.

At 604, a directed radar transmission is projected to an entity in the selected direction. This is shown at FIG. 1, where radar-communication device 102 emits radar transmission 106 via radar system 104 to receiving device 108. This entity to which the directed radar transmission is directed can include various devices, but can also be a specific application or peripheral device of a receiving device, such as an application on a computing device.

In more detail, the directed radar transmission can be a directed-beam narrow field. In such a case, a simple or even no gesture need be made to the radar transmission to begin communication between radar-communication device 102 and receiving device 108, as receiving device 108 may determine that communication is desired through the direction of the directed-beam narrow field. While the gesture interacting with the radar transmission, or direction (e.g., pointing) of the radar transmission to receiving device 108, is described in the context of establishing communication, and in some other portions herein control of an entity, various other actions can be triggered. Thus, these example actions are not limited to selecting an entity to control or device with which to alter communication.

At 606, a reflection caused by an interaction made with the directed radar transmission is received, such as at radar antenna 114 of radar system 104. This reflection can be received at radar antenna 112. The type of reflection depends on the frequency as well as other characteristics of radar transmission 106. Thus, when the directed radar field includes time-split radar transmissions, one of the time-split radar transmissions transmits data and the other of the time-split radar transmissions can reflect radar from human tissue. In this case receiving the reflection caused by the interaction receives the reflection from human tissue from the other of the time-split radar transmissions, thereby permitting data to be communicated with less interaction from the interaction.

Another example radar transmission 106 includes directed beams, where some of the beams are interrupted by an interaction and others are not, thereby enabling data transmission by un-interrupted beams while sensing gestures with the interrupted beams.

In still other cases, the radar transmission is interrupted by the interaction, such as for radar transmissions having a single type of transmission. This single type of transmission, however, can reduce costs in producing radar system 104 and still enable data transmission and gesture sensing.

At 608, a gesture made within the directed radar transmission and indicated by the interaction is determined. The determination of the gesture based on the interaction can be performed by system manager 124 and/or gesture manager 406. The determined gesture can be as simple as an interruption or a complex, multi-target, moving three-dimensional gesture. With more-complex gestures mentioned above, gesture manager 406 can map particular gestures or types of gestures to particular devices or applications or peripherals associated with those devices. Thus, one particular gesture may map to control or communication with laptop 108-4, another may map to microwave 108-6, and so forth.

At 610, a selection concerning control of an entity is determined based on the gesture. As noted, these selections can include starting or ceasing communication and various types of control of the entity—from initiating a stream of content from a smart phone 412 to a television 108-2, to dispensing water from refrigerator 108-5, to flipping through pages or images on desktop computer 108-1, to controlling playback of media on television 108-2.

At 612, the selection is passed to the entity effective to cause the control. This passing of the selection (e.g., control gesture) can be through the same radar transmission, though this is not required. For example, any suitable network interface may be used to communicate the selection or other information between radar-communication device 102 and receiving device 108. Following operation 612, methods 600 may return to operation 606 to continue to receive gestures to control receiving device 108 (or radar-communication device 102).

FIG. 7 depicts method 700, which enables radar-based gesture sensing and data transmission with operations from a perspective of a receiving device.

At 702, a directed radar transmission is received from a radar-communication device. This directed radar transmission can be through a physical orienting of a radar element of a radar-communication device toward a radar antenna (e.g., radar system 104 of radar-communication device 102 to radar antenna 114 of receiving device 108).

In some cases, the directed radar transmission is a broad field having different characteristics at a center of the broad field than at a periphery of the broad field. In such a case, a receiving device (e.g., radar system 104 of receiving device 108) determines, based on characteristics of radar received, that the directed radar transmission is directed to a computing device on which the method is performed.

In some other cases, the directed radar transmission is a directed-beam narrow field. In such a case, the receiving device the determination can be simply based on receiving the radar transmission.

At 704, a reflection caused by an interaction made with the directed radar transmission is received. This interaction can interfere or not interfere with the radar transmission. In cases where the directed radar transmission includes time-split radar transmissions, one of the time-split radar transmissions can send data and the other, which is configured to reflect radar from human tissue rather than pass through human tissue as is with the other radar transmission, can receive the reflection caused by the interaction from human tissue.

At 706, a gesture made within the directed radar transmission is determined based on the interaction. This gesture can be to begin a data connection, in which case a handshake protocol to begin a new data connection with a computing device associated with the radar-communication device can be performed. Alternately, this gesture can instead be to cease a current data connection, in which case the data connection is shut down.

At 708, a selection concerning a data connection is determined based on the gesture. As noted, this can be to start or cease communications. The data connection may communicate any suitable type data, such as user files, images, music, video, streaming content, and so on. As such, the selection can be to initiate a stream of content (or media) between devices, terminate the stream of content, or select another device as a destination for the stream of content. In some cases, a state of the data connection or data being communicated thereby is determined. For example, if media is being streamed via the data connection, a point at which media playback ceases may be determined to enable subsequent media playback to resume at that point when a data connection is established at another device.

At 710, the data connection is altered based on the selection. The data connection is not required to be between a receiving device and a computing device with which the radar-communication device may be integral. Thus, the data connection can be from the receiving device to a third device connected with or associated with the radar-communication device, such as in a case where radar transmitter 414 is acting as a transmitter to set up or pass data with another device, such as a user's tablet 108-3 to a television 108-2.

Following a data connection being made at operation 710, method 700 may proceed to operations 712, 714, and 716. At 712, a second reflection caused by a second interaction made with the directed radar transmission is received. As noted above, a reflection from an interaction can be received at a transmitting device or a receiving device, such as antenna 112 at receiving device 108.

At 714, a second gesture made within the directed radar transmission is determined based on the second interaction. This can be accomplished similarly to as noted in method 600 above. For example, receiving gesture manager 506 can determine the gesture to be of a particular type or unique, and map it to a desired control, device function, and/or entity (e.g., to control a particular application of receiving device 108).

At 716, the second gesture is passed to an application, an operating system, or a device effective control the application, the operating system, or the device. As noted above, the passed gesture can control or invoke any suitable function of the application, operating system, or device. For example, the passed gesture may pause playback, advance playback, or skip playback of media tracks being presented by a device.

As shown with dashed lines in FIG. 7, method 700 may perform some mix of operations, excluding some and repeating others. Thus, after a data connection is established, other controls can be received, thereby performing operations 712, 714, and 716 (e.g., to control the same or other entities of receiving device 108) or repeating operations 704, 706, and 710 (e.g., to cease the data connection).

The preceding discussion describes methods relating to radar-based gesture sensing and data transmissions. Aspects of these methods may be implemented in hardware (e.g., fixed logic circuitry), firmware, software, manual processing, or any combination thereof. These techniques may be embodied on one or more of the entities shown in FIGS. 1-5 and 8 (computing system 800 is described in FIG. 8 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 8:
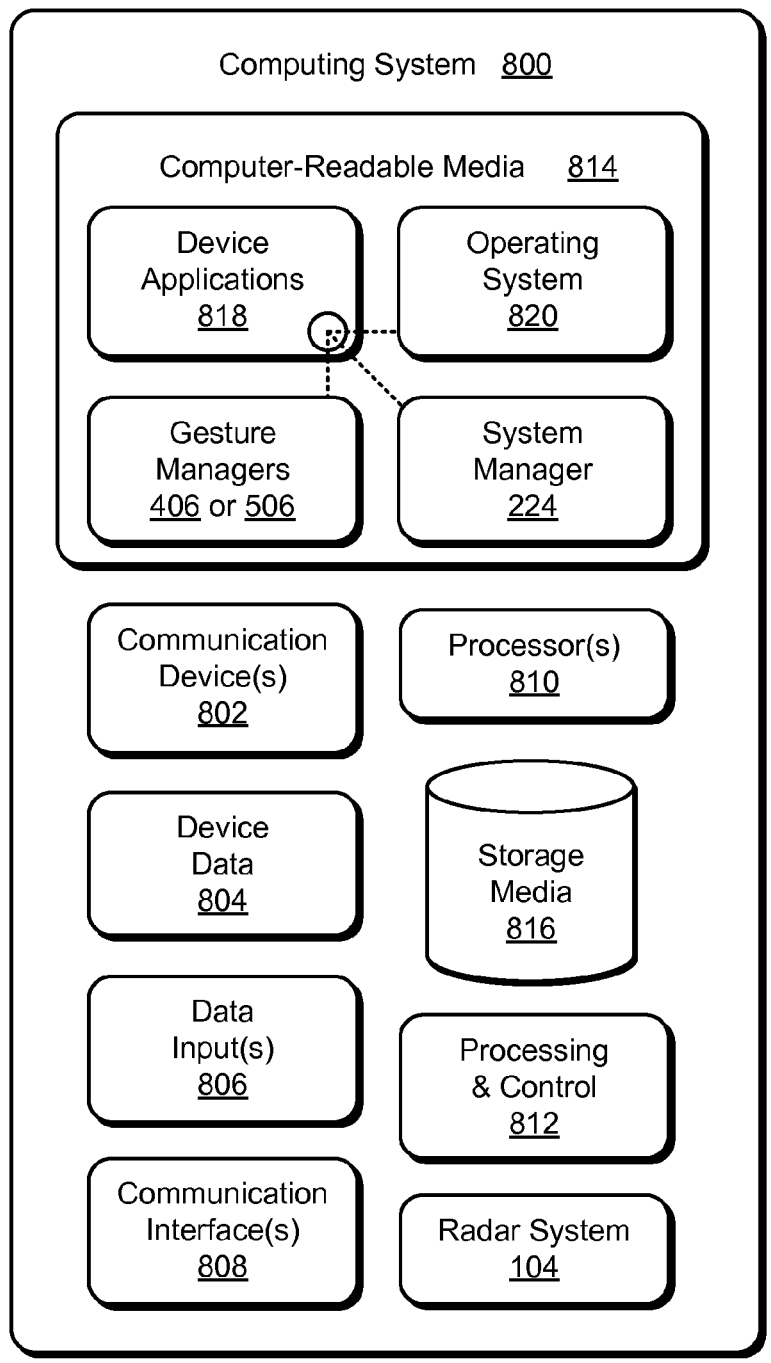
FIG. 8 illustrates an example device embodying, or in which techniques may be implemented that enable use of, a radar-based gesture sensing and data transmission.

FIG. 8 illustrates various components of example computing system 800 that can be implemented as any type of client, server, and/or computing device as described with reference to the previous FIGS. 1-7 to implement a radar-based gesture sensing and data transmission. In embodiments, computing system 800 can be implemented as one or a combination of a wired and/or wireless wearable device, System-on-Chip (SoC), and/or as another type of device or portion thereof. Computing system 800 may also be associated with a user (e.g., a person) and/or an entity that operates the device such that a device describes logical devices that include users, software, firmware, and/or a combination of devices.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on computing system 800 can include any type of audio, video, and/or image data. Computing system 800 includes one or more data inputs 806 via which any type of data, media content, and/or inputs can be received, such as human utterances, interactions with a localized radar field, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, a radar-based gesture sensing and data transmission. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device 816 and radar system 104, including one or more or multiples of each of radar system 104's elements or components noted in FIG. 1 above.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on.

Device applications 818 also include any system components, entities, or managers to implement radar-based gesture sensing and data transmission. In this example, device applications 818 include gesture manager 406 or receiving gesture manager 506 and system manager 124.

CONCLUSION

Although embodiments of techniques using, and apparatuses including, radar-based gesture sensing and data transmission have been described in language specific to features and/or methods, it is to be understood that the subject of the appended claims is not necessarily limited to the specific features or methods described. Rather, the specific features and methods are disclosed as example implementations of radar-based gesture sensing and data transmission.

What is claimed is:

1. A computer-implemented method comprising:
   receiving selection, through one or more direction sensors of a radar-communication device, of a direction for projection of a radar transmission;
   projecting, through a radio element of a radar system of the radar-communication device, a directed radar transmission in the selected direction, the directed radar transmission transmitting data from the radar-communication device;
   receiving, at an antenna of the radar-communication device, a reflection caused by an interaction made with the directed radar transmission;
   determining, at a computing system associated with the radar-communication device, that the interaction indicates gesture data associated with a gesture made within the directed radar transmission;
   determining, based on the gesture data, the gesture;
   determining, based on the gesture, a selection concerning control of an entity; and
   passing the selection to the entity effective to cause the control.

2. The computer-implemented method as described in claim 1, wherein the selection of the direction is received through orientation sensors included within the one or more direction sensors.

3. The computer-implemented method as described in claim 1, wherein the entity is a device to which the radar transmission is selected to be directed.

4. The computer-implemented method as described in claim 1, wherein the selection is to control data transmission between the entity and the radar-communication device.

5. The computer-implemented method as described in claim 1, wherein the directed radar transmission includes time-split radar transmissions, a first of the time-split radar transmissions transmitting the data and the second of the time-split radar transmissions configured to reflect radar from human tissue, and wherein receiving the reflection caused by the interaction receives the reflection from human tissue and from the second of the time-split radar transmissions.

6. The computer-implemented method as described in claim 1, wherein determining the gesture determines that the gesture is of a particular type and determining the selection is based on the particular type.

7. The computer-implemented method as described in claim 1, wherein determining that the interaction indicates the gesture determines that the gesture is a simple interruption by human tissue of the directed radar transmission.

8. The computer-implemented method as described in claim 1, wherein the directed radar transmission is a direct-beam narrow field.

9. A computer-implemented method comprising:
   receiving, at a radar antenna of a radar system, a directed radar transmission from a radar-communication device, the radar antenna configured to receive the directed radar transmission and reflections of the directed radar transmission;
   receiving, at the radar antenna of the radar system, a reflection of the directed radar transmission caused by an interaction made with the directed radar transmission;
   determining, at a computing system associated with the radar system, that the interaction indicates gesture data associated with a gesture made within the directed radar transmission;
   determining, based on the gesture data, the gesture;
   determining, at the computing system and based on the gesture, a selection concerning a data connection; and
   altering the data connection based on the selection.

10. The computer-implemented method as described in claim 9, wherein the selection is to begin the data connection and the altering the data connection performs a handshake protocol to begin a new data connection with another computing device that is associated with the radar-communication device.

11. The computer-implemented method as described in claim 9, wherein the selection is to cease the data connection and the altering the data connection ceases the data connection.

12. The computer-implemented method as described in claim 9, wherein the directed radar transmission is directed by a physical orienting of a radar element of the radar-communication device toward the radar antenna associated with the computing system.

13. The computer-implemented method as described in claim 12, wherein the directed radar transmission is a broad field having different characteristics at a center of the broad field than at a periphery of the broad field and further comprising determining, based on characteristics of radar received that the directed radar transmission is directed to a computing device on which the method is performed.

14. The computer-implemented method as described in claim 12, wherein the directed radar transmission is a directed-beam narrow field and further comprising determining that the directed radar transmission is directed to a computing device on which the method is performed based on receiving radar from the radar-communication device.

15. The computer-implemented method as described in claim 9, wherein the directed radar transmission includes time-split radar transmissions, a first of the time-split radar transmissions sending data and the second of the time-split radar transmissions configured to reflect radar from human tissue, and wherein receiving the reflection caused by the interaction receives the reflection from human tissue and from the second of the time-split radar transmissions.

16. The computer-implemented method as described in claim 9, wherein determining the gesture determines that the gesture is of a particular type and determining the selection is based on the particular type.

17. The computer-implemented method as described in claim 9, wherein the data connection is to a third-party device connected with or associated with the radar-communication device.

18. The computer-implemented method as described in claim 9, further comprising:

receiving a second reflection caused by a second interaction made with the directed radar transmission;

determining that the second interaction indicates second gesture data associated with a second gesture made within the directed radar transmission; and passing the second gesture to an application, an operating system, or a device effective to control the application, the operating system, or the device.

19. A radar system comprising:

a radio element configured to provide a radar transmission, the radar transmission transmitting data and capable of interacting with human tissue;

a radar antenna configured to receive reflections from interactions by the human tissue in the radar transmission that transmits the data and is capable of interacting with the human tissue;

a signal processor configured to process the received reflections in the radar transmission sufficient to determine the received reflections in the radar transmission comprise gesture data associated with a gesture; and a system manager configured to determine the gesture from the gesture data and to cause a data communication to be altered between the radar system and a computing device, the alteration based on the determined gesture.

20. The radar system as recited in claim 19, wherein the radar system is operably coupled with another computing device, the data communication includes content streaming, and the alteration of the data communication includes one of:

initiating a stream of content between the computing device and the other computing device; or ceasing the stream of content between the computing device and the other computing device.

* * * * *